Figure 1:
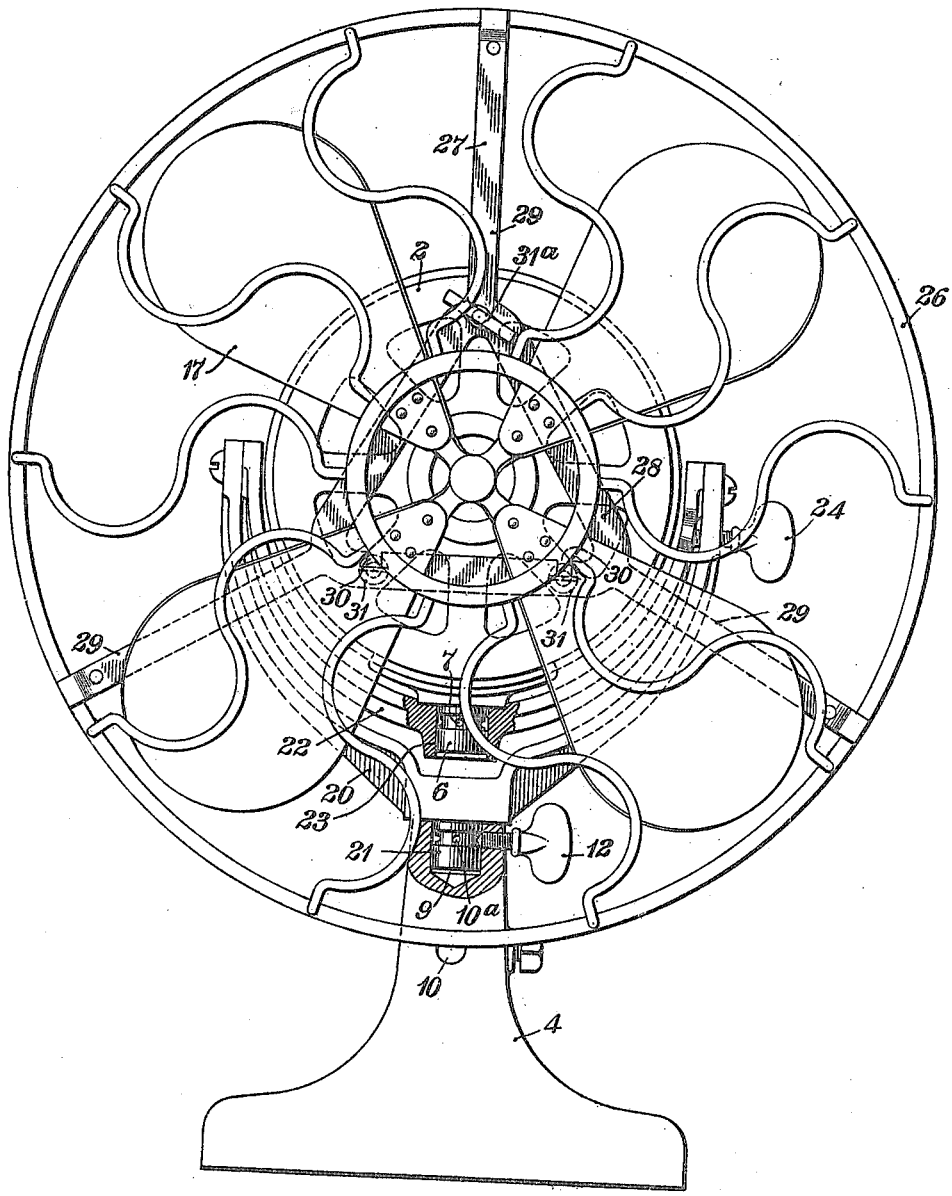

W. BARNES, Jr.
ELECTRIC MOTOR.
APPLICATION FILED DEC. 29, 1909.

1,135,093.

Patented Apr. 13, 1915.
3 SHEETS—SHEET 1.

WITNESSES:
INVENTOR
Wilfred Barnes Jr.
BY
ATTORNEY

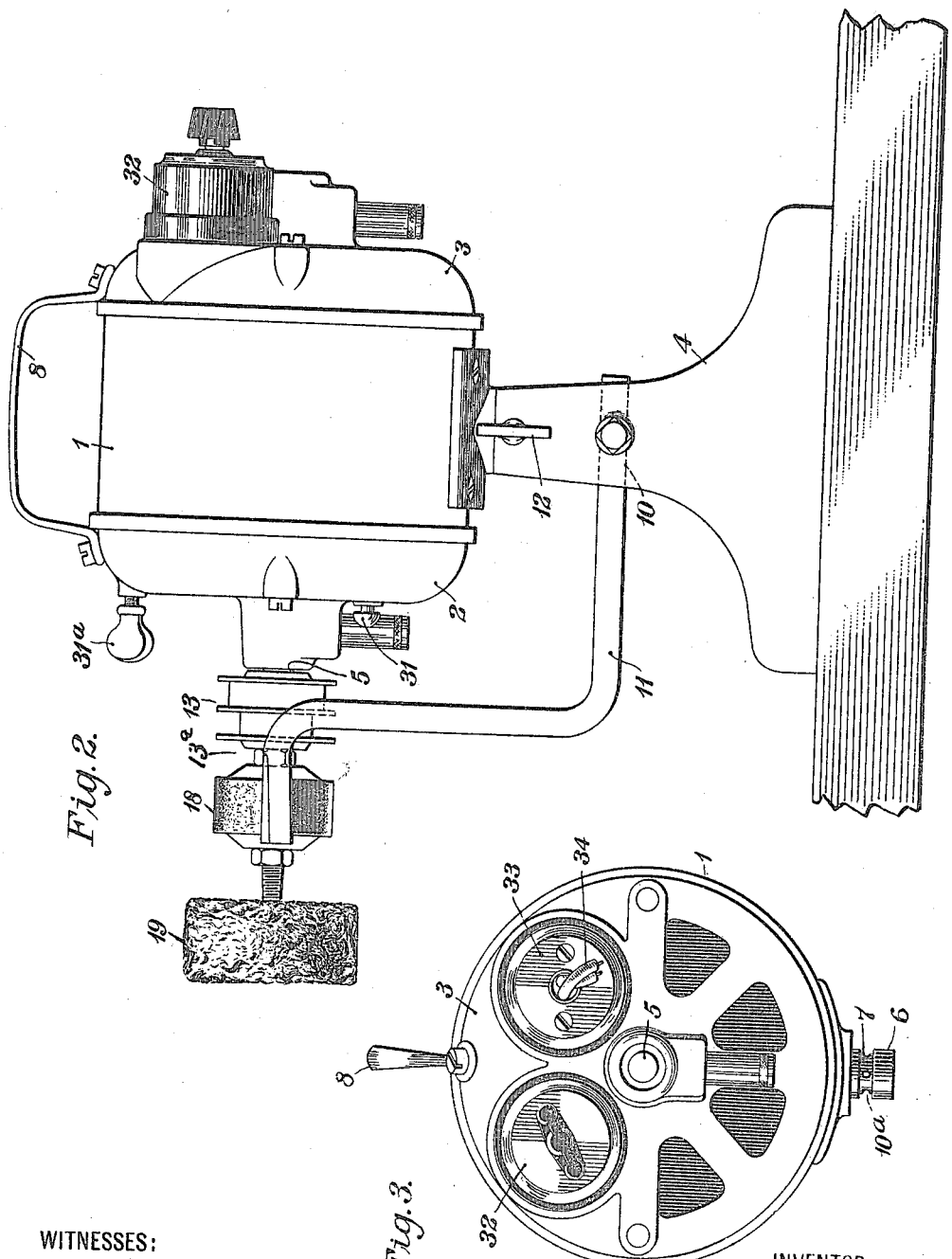

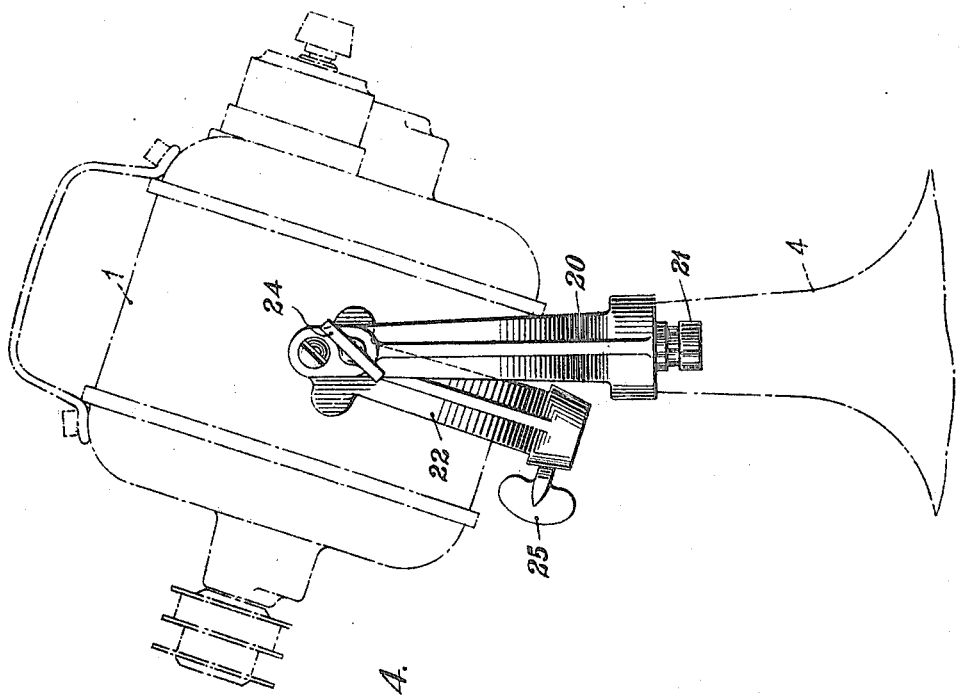

UNITED STATES PATENT OFFICE.

WILFRED BARNES, JR., OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC MOTOR.

1,135,093.      Specification of Letters Patent.      Patented Apr. 13, 1915.

Application filed December 29, 1909. Serial No. 535,404.

*To all whom it may concern:*

Be it known that I, WILFRED BARNES, Jr., a citizen of the United States, and a resident of Wilkinsburg, in the county of Allegheny and State of Pennsylvania, have invented a new and useful Improvement in Electric Motors, of which the following is a specification.

My invention relates to dynamo-electric machines and particularly to the mechanical features of electric motors of small size.

The object of my invention is to provide a simple and durable motor having such mechanical structure and such accessories as to render it adaptable to various small power operations. For example; it is my aim to provide an efficient motor, which may be used as an ordinary fan or blower motor, for driving a sewing machine and for various other household purposes, as more fully pointed out hereinafter.

Since electric energy is so generally used for lighting purposes, not only in large public buildings, but also in private residences, the use of small electric motors for household purposes has become very general, more particularly, for operating fans and sewing machines. Motors of the prior art have usually been so designed and constructed that they were only adapted for specific purposes and it was therefore necessary to utilize several motors in order to accomplish several different operations, none of which require a continuous, or even a frequently recurring, service.

According to my present invention, I provide a motor structure and a large number of simple means coöperating therewith whereby the same motor may be utilized successfully for many different kinds of service.

Figure 1 of the accompanying drawings is a front elevation, partially in section, of a motor constructed in accordance with my invention, a fan and a fan guard being shown attached to it. Fig. 2 is a side elevation of the motor shown in Fig. 1, the fan being replaced in this figure by grinding and buffing wheels, and the double trunnion of Fig. 1 being removed. Fig. 3 is an end view of the motor body shown in Fig. 2. Fig. 4 is a detail view of the double trunnion shown in Fig. 1, the motor body being shown in broken lines.

Referring to the drawings, the motor here shown comprises a frame or body 1, having a pair of end bells or brackets 2 and 3, a base 4 and a rotatable shaft 5 on which the motor armature is mounted.

The body or frame of the motor is provided with a downwardly extending cylindrical projection 6 having an annular groove 7, and with a handle grip 8 which projects upwardly from the frame and by which the motor may be readily carried from place to place.

The base 4 is provided with a recess 9, which is adapted to receive the projection 6, as shown in Fig. 2, and with a hole 10, which forms a bearing for a rest or guide 11. A thumbscrew 12 is threaded into the base and projects into the recess 9, it being adapted to engage any one of a plurality of indentations $10^a$ in the base of the annular groove 7 in order to accentuate predetermined positions of the motor. The arrangement of parts is such that the thumbscrew may prevent the motor frame from being accidentally seperated from the base, while rotation of said frame thereon is permitted. The thumbscrew may, of course, be used for rigidly clamping the motor frame to the base in any desired position.

A step pulley 13 is attached to the end of the shaft 5 and comprises a hub member $13^a$ to which may be attached the fan 17 of Fig. 1, the grinding and buffing wheels 18 and 19 of Fig. 2, or any other suitable attachment with which the motor may be provided.

The arrangement and form of the parts are such that the outer shell of the pulley 13 may be easily removed and reversed when it is desired to adjust the maximum speed of a sewing machine or other device to which the motor is belt-connected, and no adjustment of the alinement of an intermediate or idle pulley is necessary. The pulley 13 thus serves as a chuck for holding the other attachments, but it may also be used, independently of them, for driving purposes.

The member 11 may be utilized as a tool rest if it is desired to use the motor shaft as a turning lathe, or it may be used as a work rest when the grinding and buffing wheels, or other tools, are rotated by the motor shaft.

A drill chuck or face plate may, of course, be substituted for the devices 18 and 19 of Fig. 2, in which case, various boring operations may be performed.

The double trunnion comprises an outer yoke 20 having a projection 21 corresponding to the projection 6 of the motor frame, by which it may be rotatably supported upon the base 4, and an inner yoke 22 having a recess 23 which corresponds to the recess 9 in the base and which is adapted to receive the projection 6 of the motor frame. The two yokes are pivotally connected at the ends of their arms and the outer yoke is provided with a thumbscrew 24 by which the relative position of the second may be fixed as desired, and the inner yoke 22 is provided with a thumbscrew 25 which corresponds to the screw 12 on the base and is adapted to engage the groove 7 in the projection 6. The arrangement of parts is such that the double trunnion constitutes a universal joint connection between the motor frame and the base, when it is utilized, but, nevertheless, the double trunnion may be discarded without exposing any unsightly projections and without detracting from the proportion and symmetry of the motor. The double trunnion may, of course, be employed not only when the fan is in use, but at any time when it is found convenient.

The fan 17 is provided with a guard 26 having any suitable cylindrical cage structure for inclosing the fan blades, and a triangular support 27 by which it is removably attached to the motor frame. The support 27 is composed of a triangular center 28 from which a plurality of arms 29 extend radially outward. The triangular center is provided with notches 30 which are adapted to engage screws or rivets 31 with which the end bell 2 of the motor is equipped, a third point of support being provided by means of a thumbscrew 31ª which projects through a hole in the frame 27 and is screwed into the end bell 2 of the motor. The end bell 3 of the motor is provided with a snap switch 32 by which the motor circuit may be interrupted and with a plug and socket connector 33, to one portion of which the external circuit conductors 34 are connected.

It is evident that structural modifications may be effected within the spirit and scope of my invention and I desire that only such limitations shall be imposed as are indicated in the appended claims.

I claim as my invention:

1. In an electric motor, the combination with a stationary base having a recess and a locking screw, of a frame or body having a downwardly extending projection adapted to engage the recess in the base and having a circumferential recess to receive the end of said locking screw, and a double trunnion comprising two yokes one of which has a cylindrical projection provided with a circumferential recess and the other of which has a cylindrical recess and a locking screw.

2. In a portable electric motor, the combination with a frame having a cylindrical projection provided with a circumferential groove containing accentuating indentations, a base having a cylindrical recess and a locking screw, of an interposed double trunnion comprising two yokes one of which has a cylindrical projection provided with a circumferential recess containing accentuating indentations and the other of which has a cylindrical recess and a locking screw.

3. In an electric motor, the combination with a stationary base having a vertical recess and a transverse recess, a frame or body having a downwardly extending projection adapted to engage the vertical recess of the base, of a double trunnion which may be interposed for providing a universal joint connection between the motor and the base, and a rest or guide adjustably supported in the transverse recess of the base.

In testimony whereof, I have hereunto subscribed my name this 15th day of Dec., 1909.

WILFRED BARNES, Jr.

Witnesses:
R. J. DEARBORN,
B. B. HINES.

Copies of this patent may be obtained for five cents each, by addressing the "Commissioner of Patents, Washington, D. C."